United States Patent [19]

Garkawe

[11] Patent Number: 5,116,394
[45] Date of Patent: May 26, 1992

[54] CYCLONE SEPARATOR ROOF

[75] Inventor: Michael Garkawe, Madison, N.J.

[73] Assignee: Foster Wheeler Energy Corporation, Clinton, N.J.

[21] Appl. No.: 673,920

[22] Filed: Mar. 25, 1991

[51] Int. Cl.⁵ .............................................. B01D 45/12
[52] U.S. Cl. ..................................... 55/259; 55/459.1
[58] Field of Search .................. 110/331; 55/267–269, 55/459.1, 435; 220/901

[56] References Cited

U.S. PATENT DOCUMENTS

| | | | |
|---|---|---|---|
| 1,032,012 | 7/1912 | Martin | 52/82 |
| 1,907,268 | 5/1933 | Schwemlein | 52/82 |
| 3,470,678 | 10/1969 | Clark et al. | 55/269 |
| 4,615,715 | 10/1986 | Seshamani | 55/269 |
| 4,712,938 | 12/1987 | Seshamani et al. | 403/24 |
| 4,746,337 | 5/1988 | Magol et al. | 55/269 |
| 4,880,450 | 11/1989 | Magol et al. | 55/269 |
| 4,904,286 | 2/1990 | Magol et al. | 55/269 |
| 4,944,250 | 7/1991 | Seshamani | 122/20 B |

FOREIGN PATENT DOCUMENTS 2527478  5/1982  France .
78894  6/1980  Japan ................................. 220/901

Primary Examiner—Bernard Nozick
Attorney, Agent, or Firm—Marvin A. Naigur

[57] ABSTRACT

A cyclone separator roof which accommodates differential thermal expansion and contraction. When the inner and outer cylinders of a cyclone separator are operated at different temperatures, such as in a cyclone separator having walls formed by water-steam cooled tubes, this causes differential thermal expansion and contraction circumferentially and radially across a roof extending between such inner and outer cylinders. The cyclone separator roof of the present invention includes a corrugated, annular upper seal plate having expansion joints which enable the roof to accommodate differential circumferential and radial thermal expansion and contraction. The corrugations in the plate extend radially from the center of the plate and accommodate differential circumferential thermal expansion and contraction across the roof. The expansion joints are disposed in the plate and are aligned coaxially with the inner and outer circumferences of the plate to accommodate differential radial thermal expansion and contraction across the roof.

21 Claims, 1 Drawing Sheet

CYCLONE SEPARATOR ROOF

BACKGROUND OF THE INVENTION

This invention relates to a cyclone separator roof and, more particularly, to a roof for such a separator for separating solid fuel particles from gases discharged from a combustion system or the like.

Conventional cyclone separators are normally provided with a monolithic external refractory wall and roof which are abrasion resistant and insulative so that the outer casing runs relatively cool. Typically, these walls and roofs are formed by an insulative refractory material sandwiched between an inner hard refractory material and an outer metal casing. In order to achieve proper insulation, these layers must be relatively thick which adds to the bulk, weight, and cost of the separator. Also, the outer metal casing of these designs cannot be further insulated from the outside since to do so could raise its temperature as high as 1500° F. which is far in excess of the maximum temperature it can tolerate.

Cyclone separators having water steam cooled walls are also known in the art. Cyclone separators using water-steam cooled walls reduce heat losses and minimize the need for internal refractory material. By doing so, these separators also reduce the bulk, weight, and cost of the separators, and these separators reduce the need for refractory-lined ductwork and expansion joints between the cyclone separator and the furnace and heat recovery sections. The roofs of these water-steam cooled cyclone separators have been formed using a metal outer casing with an inner refractory lining and using water-steam cooled tubes. The roofs formed using a metal outer casing with an inner refractory lining suffer from the deficiencies mentioned above with respect to conventional cyclone separators.

Roofs formed using water steam cooled tubes have been formed as separate roof tube circuits and have also been formed from the tubes of the walls of the outer cylinder, by bending the tubes radially inwardly towards the inner cylinder. Examples of such separator roofs are provided by U.S. Pat. No. 4,615,715, U.S. Pat. No. 4,746,337, U.S. Pat. No. 4,880,450, and U.S. Pat. No. 4,904,286, all owned by assignee Foster Wheeler Energy Corporation. Roofs formed by water-steam cooled tubes work well, but such roofs increase the fabrication cycle, are less flexible from an erection standpoint, and are relatively expensive.

SUMMARY OF THE INVENTION

It is therefore an object of the present invention to provide a cyclone separator roof in which the bulk, weight, and cost of the separator roof are much less than those of conventional separator roofs.

It is a still further object of the present invention to provide a cyclone separator roof of the above type which utilizes the advantages of water-steam cooled cyclone separators while eliminating the need for expensive, difficult to-construct roofs formed by water-steam cooled tubes.

It is a still further object of the present invention to provide a cyclone separator roof which will accommodate differential circumferential thermal expansion.

It is a still further object of the present invention to provide a cyclone separator roof which will accommodate differential radial thermal expansion.

It is a still further object of the present invention to provide an independent roof for a cyclone separator of the above type which will reduce the overall costs, decrease the fabrication cycle, and provide greater flexibility from an erection standpoint.

Toward the fulfillment of these and other objects, the cyclone separator roof of the present invention includes a corrugated annular upper seal plate having expansion joints and extending between inner and outer cylinders of a cyclone separator. The corrugations extend radially from the center of the upper seal plate to accommodate differential circumferential thermal expansion and contraction across the roof. Expansion joints are affixed to the upper seal plate and are aligned coaxially with the inner circumference of the annular upper seal plate to accommodate differential radial thermal expansion and contraction across the roof.

BRIEF DESCRIPTION OF THE DRAWINGS

The above brief description as well as further objects, features, and advantages of the present invention will be more fully appreciated by reference to the following detailed description of presently preferred but nonetheless illustrative embodiments in accordance with the present invention when taken in conjunction with the accompanying drawings wherein.

DESCRIPTION OF THE PREFERRED EMBODIMENT

Figure 1:
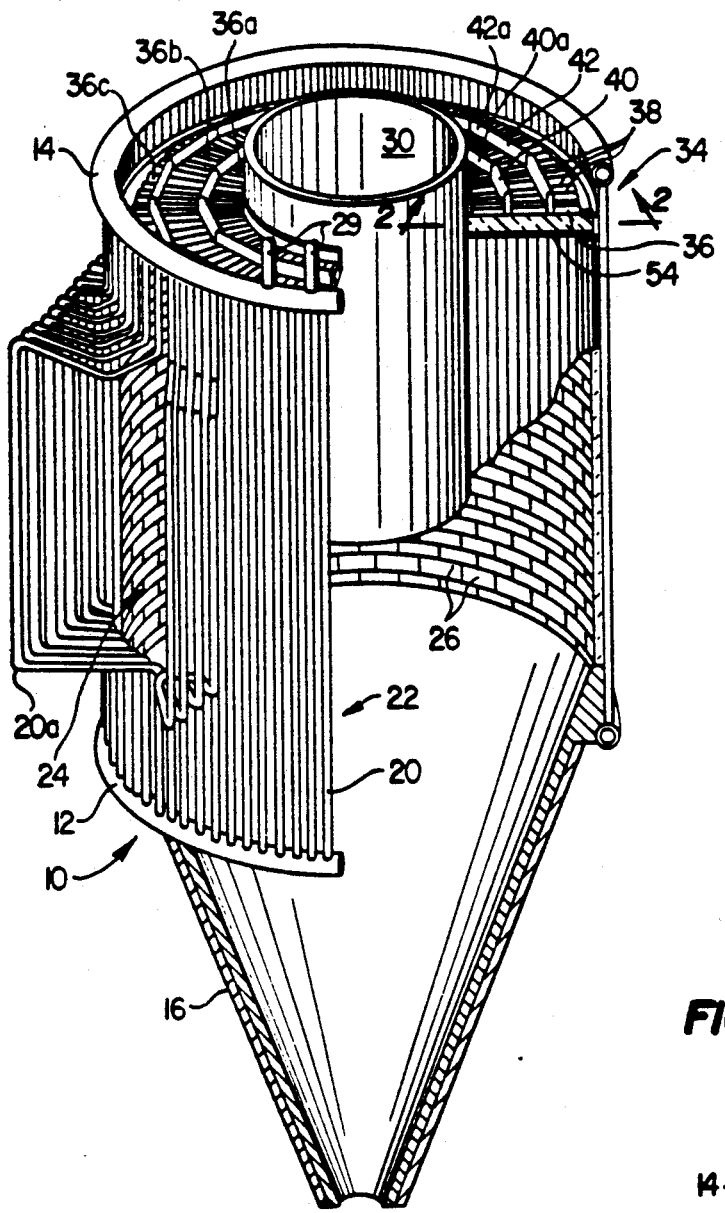
FIG. 1 is a perspective/schematic view of a water-steam cooled cyclone separator which includes the roof of the present invention.

Referring to FIG. 1 of the drawings, the reference numeral 10 refers in general to a cyclone separator which includes a lower ring header 12 and an upper ring header 14. The lower ring header 12 extends immediately above, and is connected to, a conical hopper 16 disposed at the lower portion of the separator 10.

A group of vertically extending, spaced, parallel tubes 20 are connected at their lower ends to the header 12 and extend vertically for the greater parts of their lengths to form a right circular outer cylinder 22. The tubes 20 are connected by means of continuous fins (not shown) disposed at diametrically opposed portions of the tubes and connected thereto in a conventional manner to render the wall air-tight. A portion of the tubes 20 are bent out of the plane of the outer cylinder 22, as shown by the reference numeral 20a, to form an inlet passage 24 to the interior of the cylinder for reasons that will be described.

A plurality of tiles 26 extend adjacent the inner wall of the outer cylinder 22 and are connected thereto in a conventional manner. A layer of refractory 28 (shown in FIG. 2) is placed between the tiles 26 and the tubes 20. The upper ends of the tubes 20 are connected to the upper header 14.

A plurality of vertical pipes 29 extend upwardly from the upper header 14, it being understood that the lower header 12 can be connected to a source of cooling fluid, such as water, or steam, which passes from the lower header 12, through the tubes 20, and into the upper header 14 before being discharged, via the pipes 29, to external equipment. The direction of flow for the cooling fluid could also be reversed.

An inner cylinder, or barrel, 30 is disposed within the outer cylinder 22, is formed from a solid, metallic material, such as stainless steel or high alloy austenitic, and has an upper end portion extending slightly above the plane formed by the upper header 14. The length of the inner cylinder 30 approximately coincides with the inlet passage formed by the bent tube portions 20a. Thus, an annular passage is formed between the outer surface of the inner cylinder 30 and the inner surface of the outer cylinder 22, for reasons that will be discussed. A roof 34 extends between upper portions of the outer and inner cylinders 22, 30.

The roof 34 comprises an annular upper seal plate 36 having a plurality of corrugations 38 and having inner and outer U-fold expansion joints 40, 42 secured thereto and dividing the upper seal plate into inner, medial, and outer portions 36a, 36b, 36c, respectively. The corrugations 38 extend radially from an axis of the upper seal plate 36 so that they can accommodate differential circumferential thermal expansion across the roof 34. The inner and outer expansion joints 40, 42 are aligned coaxially with the inner and outer circumferences of the upper seal plate 36. The expansion joints 40 and 42 are U-shaped in cross-section, and the inner end of the inner expansion joint 40 is secured to the outer edge of the inner plate portion 36a, and the outer end of the inner expansion joint 40 is secured to the inner edge of the medial plate portion 36b. Similarly, the inner end of the outer expansion joint 42 is secured to the outer edge of the medial plate portion 36b, and the outer end of the outer expansion joint 42 is secured to the inner edge of the outer plate portion 36c. The inner and outer ends of the expansion joints 40 and 42 may be secured to the respective plate portions 36a, 36b and 36c in any conventional manner such as by welding. The inner and outer ends of each expansion joint 40 and 42 are movable relative to each other to accommodate differential radial thermal expansion and contraction across the roof 34.

In one embodiment, the inner and outer expansion joints 40, 42 are formed by a plurality of straight segments 40a, 42a disposed perpendicular to radii of the upper plate 36 and together form inner and outer polygons aligned coaxially with the inner and outer circumferences of the upper seal plate.

It is understood that each expansion joint may be made in one piece or in any number of segments, and each expansion joint may be disposed in the upper seal plate in any number of positions. It is also understood that the expansion joints need not be in a "U" configuration but may be in a "W" or similar type configuration. It is further understood that fewer or more expansion joints may be utilized.

Figure 2:
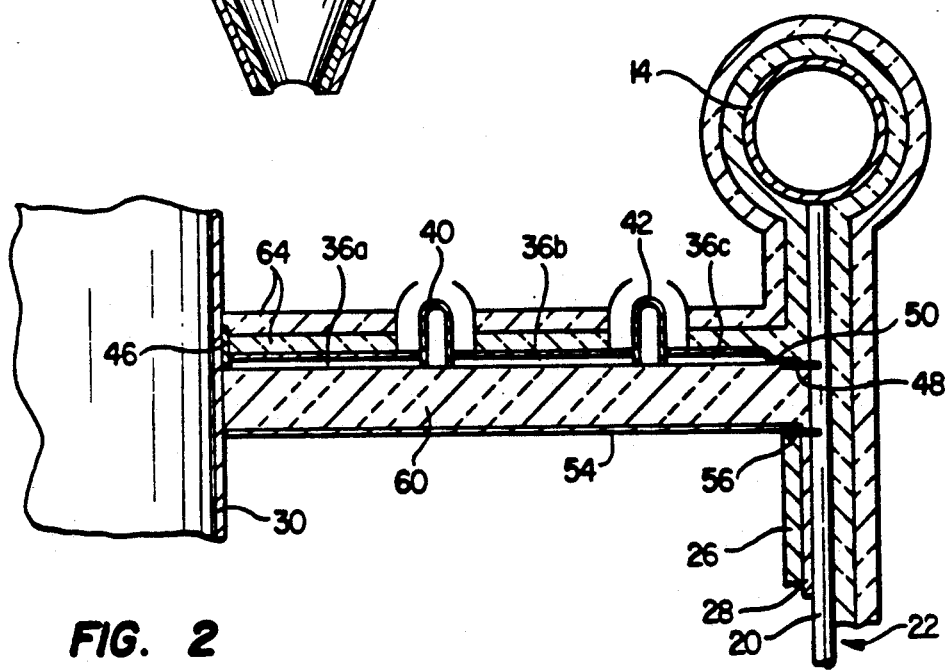
FIG. 2 is an enlarged cross sectional view taken along a portion of the roof of the separator of FIG. 1, and showing the insulative material surrounding the roof.

Referring to FIG. 2, the inner circumference of the upper seal plate 36 is affixed to an inner ring 46, such as by welding, and the inner ring 46 is affixed to the outer wall of the inner cylinder 30, such as by welding. It is understood that the inner circumference of the upper plate 36 may be affixed directly or by other means to the outer wall of the inner cylinder. An upper support, or bracket, 48 is affixed to the inner wall of the outer cylinder 22. The outer circumference of the upper seal plate 36 is affixed to the upper support ring 48, such as by welding, or directly to the outer cylinder 22.

An annular shield plate 54 is disposed below the upper seal plate 36 and extends between the inner and outer cylinders 30, 22. The inner circumference of the shield plate 54 is affixed to the outer wall of the inner cylinder 30, such as by welding, or may rest on a support ring (not shown) that is affixed to inner cylinder 30. The outer circumference of the shield plate 54 rests upon, but is not welded or otherwise affixed to, a lower support or bracket 56 which is affixed to the inner wall of the outer cylinder 22. The shield plate 54 is preferably made of Hastelloy metal but may be made of a high alloy austenitic or stainless steel material, depending upon the erosion characteristics of the fuel used in the system.

Insulative material 60, such as an annular ceramic fiber blanket, is sandwiched between the upper seal plate 36 and the shield plate 54. Additional layers of insulation 64, such as mineral wool batt, may be added above the upper seal plate 36, along the outer wall of the outer cylinder 22, around the outer surfaces of the ring headers 12, 14, and in other areas as desired.

It is understood that an upper hood, or the like (not shown), can be provided above the plane formed by the upper header 14 and can be connected to the inner cylinder 30 (not shown) The hood can be top supported from the roof of the structure in which the separator 10 is placed, and the remaining portion of the separator can be supported from hangers connected to the upper header 14 or pipes 29.

In operation, and assuming the roof of the present invention and the separator 10 are part of a boiler system including a fluidized bed reactor, or the like, disposed adjacent the separator, the inlet passage 24 formed by the bent tube portions 20a receives hot gases from the reactor, which gases contain entrained fine solid particulate fuel material from the fluidized bed. The gases containing the particulate material thus enter and swirl around in the annular chamber defined between the outer cylinder 22 and the inner cylinder 30, and the entrained solid particles are propelled against the inner wall of the outer cylinder 22 where they collect and fall downwardly by gravity into the hopper 16. The relatively clean gases remaining in the annular chamber are prevented from flowing upwardly by the shield plate 54 and the upper seal plate 36, and thus enter the inner cylinder 30 through its lower end. The gases thus pass through the length of the inner cylinder 30 before exiting from the upper end of the inner cylinder to the aforementioned hood, or the like, for directing the hot gases to external equipment for further use.

Water or steam from an external source passes into the lower header 12 and passes upwardly through the tubes 20 before exiting, via the upper header 14 and the pipes 29, to external circuitry which may form a portion of the boiler system including the separator 10. The water thus maintains the wall of the outer cylinder 22 at a relatively low temperature. Accordingly, the cyclone separator 10 will typically be operated such that the inner cylinder 30 is at a relatively high temperature, such as 1600° F., and the outer cylinder 22 is at a relatively low temperature, such as 700° F.

It can thus be appreciated that there will be differential circumferential and radial thermal expansion and contraction across the roof 34 which extends between the relatively high temperature inner cylinder and the relatively low temperature outer cylinder. The expansion joints 40, 42 accommodate relative radial movement of the roof 34 between the inner and outer cylinders 30, 22. Similarly, the corrugations 38 of the upper seal plate 36 accommodate relative circumferential movement across the roof 34. The outer circumference of the shield plate 54 rests on the lower support 56, and the inner circumference of the shield plate 54 may be affixed directly to the inner cylinder 30 or supported on a ring (not shown) that is affixed, such as by welding, to the inner cylinder 30 so that the shield plate 54 is able to move and absorb the radial and axial movements due to differential expansion.

Several advantages result from the foregoing arrangement. For example, the bulk, weight, and cost of the separator roof of the present invention are much less than those of conventional separator roofs. The separator roof of the present invention also permits one to utilize the advantages of water-steam cooled cyclone separators while eliminating the need for expensive, difficult-to-construct roofs formed by water-steam cooled tubes. The separator roof of the present invention will also accommodate differential circumferential and radial thermal expansion and contraction. The separator roof of the present invention further provides an independent roof for a cyclone separator which reduces the overall costs, decreases the fabrication cycle, and provides greater flexibility from an erection standpoint.

Other modifications, changes, and substitutions are intended in the foregoing disclosure and in some instances some features of the invention will be employed without a corresponding use of other features. Accordingly, it is appropriate that the appended claims be construed broadly and in a manner consistent with the spirit and scope of the invention herein.

I claim:

1. A cyclone separator comprising:
   an inner cylinder;
   an outer cylinder extending around said inner cylinder in a coaxial relationship to define an annular chamber between said inner and outer cylinders, said outer cylinder comprising a plurality of tubes having upper and lower ends and extending vertically and circumferentially in a parallel relationship for at least a portion of their lengths;
   a first ring header connected to said upper ends of said tubes;
   a second ring header connected to said lower ends of said tubes;
   means for directing gases containing solid particles through said annular chamber for separating said solid particles from said gases, said separated gases exiting through said inner cylinder and said separated solids falling to a bottom portion of said separator;
   means for passing water or steam or a steam and water mixture through said first and second ring headers and said tubes to cool said outer cylinder; and
   a roof comprising first means for accommodating differential radial thermal expansion across said roof, and second means for accommodating differential circumferential thermal expansion across said roof.

2. The separator of claim 1 wherein said means for accommodating circumferential thermal expansion comprises an upper annular plate having inner and outer circumferences and having a plurality of corrugations.

3. The separator of claim 2 wherein said corrugations extend radially from an axis of said upper plate.

4. The separator of claim 2 wherein said means for accommodating differential radial thermal expansion comprises an expansion joint secured to said upper plate.

5. The roof of claim 4 wherein said expansion joint divides said upper plate into an inner plate portion and an outer plate portion; and
   wherein said expansion joint is aligned coaxially with said inner circumference of said upper plate.

6. The separator of claim 5 further comprising: mean for securing said inner circumference of said upper plate to said inner cylinder; and
   an upper support secured to said outer cylinder, said outer circumference of said upper plate being supported by said upper support.

7. The separator of claim 6 further comprising: a shield plate extending between said inner and outer cylinders below said upper plate; and
   insulation disposed between said upper plate and said shield plate.

8. A cyclone separator comprising:
   an inner cylinder;
   an outer cylinder extending around said inner cylinder in a coaxial relationship to define an annular chamber between said inner and outer cylinders;
   means for directing gases containing solid particles through said annular chamber for separating said solid particles from said gases, said separated gases exiting through said inner cylinder and said separated solids falling to a bottom portion of said separator; and
   a roof extending between said cylinders and comprising an outer annular plate, an inner annular plate, an annular expansion joint extending between said plates, said expansion joint comprising a first portion connected to one of said plates and a second portion connected to the other of said plates, said first and second portions being movable relative to each other to accommodate differential radial thermal expansion and contraction across said roof.

9. A cyclone separator comprising:
   an inner cylinder;
   an outer cylinder extending around said inner cylinder in a coaxial relationship to define an annular chamber between said inner and outer cylinders;
   means for directing gases containing solid particles through said annular chamber for separating said solid particles from said gases, said separated gases exiting through said inner cylinder and said separated solids falling to a bottom portion of said separator; and
   a roof comprising an upper annular plate extending between said cylinders and having a plurality of corrugations extending radially from an axis of said plate to accommodate differential circumferential thermal expansion and contraction across said roof.

10. A cyclone separator comprising:
    an inner cylinder;
    an outer cylinder extending around said inner cylinder in a coaxial relationship to define an annular chamber between said inner and outer cylinders;
    means for directing gases containing solid particles through said annular chamber for separating said solid particles from said gases, said separated gases exiting through said inner cylinder and said separated solids falling to a bottom portion of said separator; and
    a roof extending between said cylinders and comprising first means for accommodating differential radial thermal expansion across said roof, and second means for accommodating differential circumferential thermal expansion across said roof.

11. The cyclone separator of claim 10 wherein said second means comprises an upper plate having a plurality of corrugations.

12. The cyclone separator of claim 2 wherein said corrugations extend radially from an axis of said upper plate.

13. The cyclone separator of claim 2 wherein said upper plate is in the form of an annular plate having an inner and an outer circumference; and wherein said first means comprises an inner expansion joint and an outer expansion joint, said inner and outer expansion joints being secured to said upper plate and being aligned coaxially with said inner circumference of said upper plate.

14. The cyclone separator of claim 2 wherein said first means comprises an expansion joint secured to said upper-plate.

15. The cyclone separator of claim 4 wherein said expansion joint has an inner end and an outer end and divides said upper plate into an inner plate portion and an outer plate portion, said inner and outer ends being movable relative to each other to accommodate differential radial thermal expansion and contraction across said roof;

wherein said inner plate portion has an outer edge which is secured to said inner end of said expansion joint; and wherein said outer plate portion has an inner edge which is secured to said outer end of said expansion joint.

16. The cyclone separator of claim 6 wherein said upper plate is in the form of an annular plate having an inner and an outer circumference, and wherein said expansion joint is aligned coaxially with said inner circumference of said upper plate.

17. The cyclone separator of claim 7 wherein said expansion joint comprises a plurality of straight segments, each of said segments being perpendicular to a radius of said upper plate, said segments forming a polygon aligned coaxially with said inner circumference of said upper plate.

18. The cyclone separator of claim 15 further comprising means for securing said inner circumference of said upper plate to said inner cylinder of said separator; and an upper support secured to said outer cylinder of said separator, said outer circumference of said upper plate being supported by said upper support.

19. The cyclone separator of claim 9 further comprising a shield plate attached to said separator below said upper plate.

20. The cyclone separator of claim 10 further comprising insulation disposed between said upper plate and said shield plate.

21. The cyclone separator of claim 10 wherein said shield plate is in the form of an annular plate having an inner circumference and an outer circumference;

wherein said inner circumference of said shield plate is secured to said inner cylinder of said separator below said upper plate; and further comprising a lower support secured to said outer cylinder of said cyclone separator below said upper support, said outer circumference of said shield plate being supported by said lower support.

* * * * *

UNITED STATES PATENT AND TRADEMARK OFFICE
CERTIFICATE OF CORRECTION

PATENT NO. : 5,116,394
DATED : May 26, 1992
INVENTOR(S) : Garkawe

It is certified that error appears in the above-identified patent and that said Letters Patent is hereby corrected as shown below:

Col. 5, line 59, before "separator" insert --cyclone--.

Col. 5, line 63, before "separator" insert --cyclone--.

Col. 5, line 65, before "separator" insert --cyclone--; Col. 6, line 1, change, "roof" to --cyclone separator--.

Col. 6, line 6, before "separator" insert --cyclone--; change "mean" to --means--.

Col. 7, line 4, change "2" to --11--.

Col. 7, line 7, change "2" to --11--.

Col. 7, line 15, change "2" to --11--.

Col. 7, line 18, change "4" to --14--.

Col. 7, line 31, change "6" to --15--.

Col. 8, line 3, change "7" to --16--.

Col. 8, line 17, change "9" to --18--.

Col. 8, line 20, change "10" to --19--.

Col. 8, line 23, change "10" to --19--.

Signed and Sealed this

Twenty-fourth Day of August, 1993

Attest:

BRUCE LEHMAN

Attesting Officer

Commissioner of Patents and Trademarks